(12) United States Patent
Chen et al.

(10) Patent No.: US 11,450,916 B2
(45) Date of Patent: *Sep. 20, 2022

(54) CASE OF BATTERY, BATTERY, POWER CONSUMPTION DEVICE, AND METHOD AND DEVICE FOR PREPARING BATTERY

(71) Applicant: CONTEMPORARY AMPEREX TECHNOLOGY CO., LIMITED, Fujian (CN)

(72) Inventors: Xiaobo Chen, Fujian (CN); Fenggang Zhao, Fujian (CN); Yao Li, Fujian (CN); Peng Wang, Fujian (CN); Zhanyu Sun, Fujian (CN); Yongshou Lin, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 35 days.

This patent is subject to a terminal disclaimer.

(21) Appl. No.: 17/113,025

(22) Filed: Dec. 5, 2020

(65) Prior Publication Data

US 2022/0013755 A1 Jan. 13, 2022

Related U.S. Application Data

(63) Continuation of application No. PCT/CN2020/101435, filed on Jul. 10, 2020.

(51) Int. Cl.
*H01M 10/613* (2014.01)
*H01M 10/625* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ............. H01M 10/613; H01M 10/625; H01M 10/643; H01M 10/647; H01M 10/6554;
(Continued)

(56) References Cited

U.S. PATENT DOCUMENTS 8,105,708 B2 1/2012 Rudorff et al.
8,147,998 B2 4/2012 Yeo
(Continued)

FOREIGN PATENT DOCUMENTS

CN 101385187 A 3/2009
CN 101604759 A 12/2009
(Continued)

*Primary Examiner* — Lingwen R Zeng
(74) *Attorney, Agent, or Firm* — Scully Scott Murphy & Presser

(57) ABSTRACT

Embodiments of the present application provide a case of a battery, a battery, a power consumption device, and a method and device for preparing a battery. The case includes: an electrical chamber configured to accommodate a plurality of battery cells and a bus component, where at least one battery cell of the plurality of battery cells includes a pressure relief mechanism; a thermal management component configured to accommodate a fluid to adjust temperatures of the plurality of battery cells; and a collection chamber configured to collect, when the pressure relief mechanism is actuated, emissions from the battery cell provided with the pressure relief mechanism; where the thermal management component is configured to isolate the electrical chamber from the collection chamber. According to the technical solutions of the embodiments of the present application, the safety of the battery can be enhanced.

20 Claims, 9 Drawing Sheets

(51) Int. Cl.
  *H01M 10/6554* (2014.01)
  *H01M 50/20* (2021.01)
  *H01M 50/502* (2021.01)
  *H01M 50/342* (2021.01)
  *H01M 10/643* (2014.01)
  *H01M 10/6556* (2014.01)
  *H01M 10/647* (2014.01)

(52) U.S. Cl.
  CPC ... *H01M 10/6554* (2015.04); *H01M 50/3425* (2021.01); *H01M 50/502* (2021.01); *H01M 10/643* (2015.04); *H01M 10/647* (2015.04); *H01M 10/6556* (2015.04); *H01M 2220/20* (2013.01)

(58) Field of Classification Search
  CPC ......... H01M 10/6556; H01M 2220/20; H01M 50/20; H01M 50/3425; H01M 50/502
  See application file for complete search history.

(56) References Cited

U.S. PATENT DOCUMENTS

| | | | |
|---|---|---|---|
| 8,758,923 B2 | 6/2014 | Yoon et al. | |
| 10,476,115 B2 | 11/2019 | Smith et al. | |
| 2009/0075158 A1 | 3/2009 | Rudorff et al. | |
| 2009/0181288 A1 | 7/2009 | Sato | |
| 2009/0220850 A1* | 9/2009 | Bitsche | H01M 10/52 429/50 |
| 2009/0305114 A1 | 12/2009 | Yeo | |
| 2009/0305116 A1 | 12/2009 | Yang et al. | |
| 2010/0136391 A1 | 6/2010 | Prilutsky et al. | |
| 2011/0135994 A1 | 6/2011 | Yang et al. | |
| 2011/0293974 A1 | 12/2011 | Yoon et al. | |
| 2013/0059175 A1 | 3/2013 | Engel et al. | |
| 2013/0095356 A1 | 4/2013 | Shimizu et al. | |
| 2015/0162648 A1 | 6/2015 | Yang et al. | |
| 2016/0293926 A1 | 10/2016 | Kamada | |
| 2017/0170439 A1 | 6/2017 | Jarvis et al. | |
| 2017/0301965 A1 | 10/2017 | Kato et al. | |
| 2018/0047959 A1 | 2/2018 | Kruger | |
| 2018/0212208 A1 | 7/2018 | Kim | |
| 2018/0351219 A1 | 12/2018 | Smith et al. | |
| 2019/0207184 A1* | 7/2019 | Koutari | H01M 50/502 |
| 2019/0229384 A1* | 7/2019 | Tasiopoulos | H01M 10/6554 |
| 2019/0273243 A1 | 9/2019 | Motokawa et al. | |
| 2020/0083575 A1 | 3/2020 | Yoo et al. | |
| 2020/0136110 A1 | 4/2020 | Koutari et al. | |
| 2020/0152941 A1 | 5/2020 | Wynn et al. | |
| 2020/0194819 A1 | 6/2020 | Aikata et al. | |
| 2020/0212526 A1 | 7/2020 | Wu et al. | |
| 2021/0135319 A1 | 5/2021 | You et al. | |
| 2021/0296721 A1 | 9/2021 | Omura et al. | |
| 2022/0013755 A1 | 1/2022 | Chen et al. | |
| 2022/0013849 A1 | 1/2022 | Zeng et al. | |
| 2022/0013853 A1 | 1/2022 | Zeng et al. | |
| 2022/0013854 A1 | 1/2022 | Liang et al. | |

FOREIGN PATENT DOCUMENTS

| | | |
|---|---|---|
| CN | 102598358 A | 7/2012 |
| CN | 104956513 A | 9/2015 |
| CN | 106784489 A | 5/2017 |
| CN | 106785182 A | 5/2017 |
| CN | 206401400 U | 8/2017 |
| CN | 208256764 U | 12/2018 |
| CN | 208298909 U | 12/2018 |
| CN | 110061329 A | 7/2019 |
| CN | 209071461 U | 7/2019 |
| CN | 209401662 U | 9/2019 |
| CN | 209822772 U | 12/2019 |
| CN | 110707260 A | 1/2020 |
| CN | 210129540 U | 3/2020 |
| CN | 111106277 A | 5/2020 |
| CN | 211376746 U | 8/2020 |
| DE | 102017212223 A1 | 1/2019 |
| EP | 3675218 A1 | 7/2020 |
| JP | 2007027011 A | 2/2007 |
| JP | 2015018706 A | 1/2015 |
| WO | 2013034225 A1 | 3/2013 |
| WO | 2018234207 A1 | 12/2018 |
| WO | 2020026973 A1 | 2/2020 |

* cited by examiner

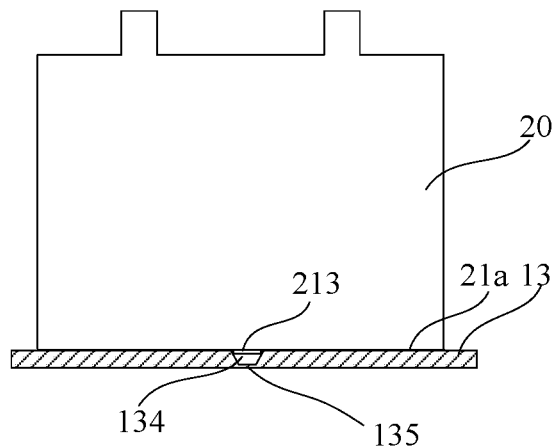
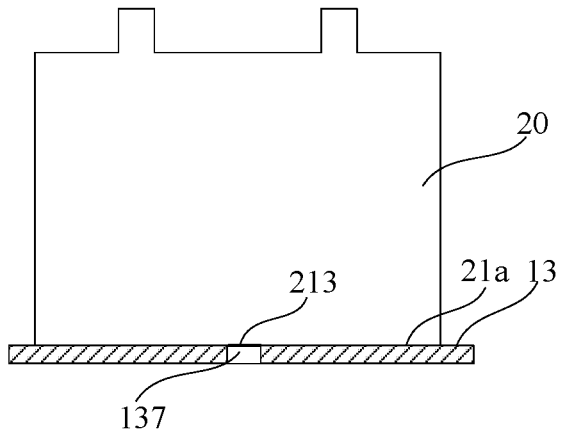
Fig. 16  Fig. 17
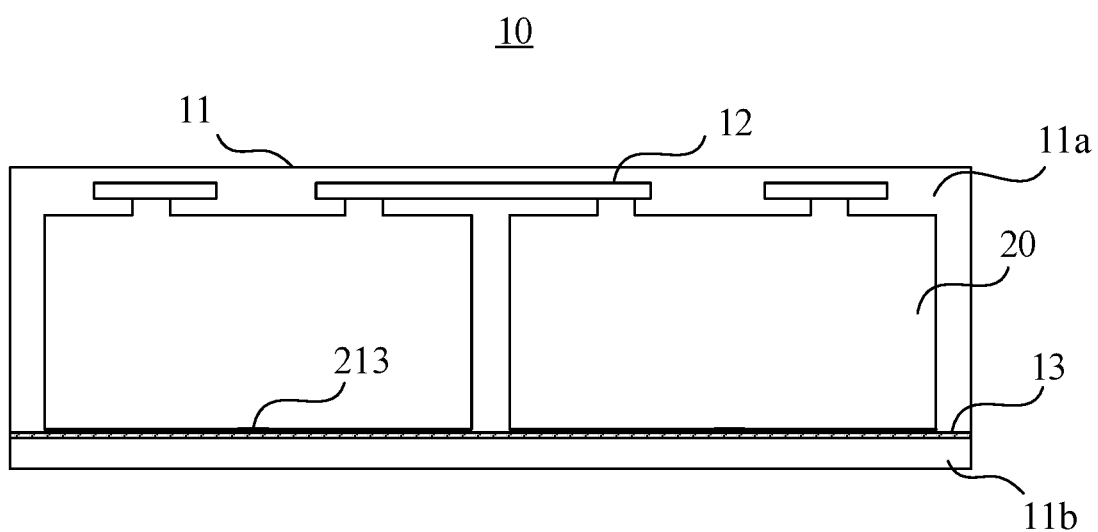
Fig. 18

CASE OF BATTERY, BATTERY, POWER CONSUMPTION DEVICE, AND METHOD AND DEVICE FOR PREPARING BATTERY

CROSS-REFERENCE TO RELATED APPLICATIONS

This application is a continuation of International Application No. PCT/CN2020/101435, filed on Jul. 10, 2020, which is hereby incorporated by reference in its entirety.

TECHNICAL FIELD

Embodiments of the present application relate to the field of batteries, and in particular, to a case of a battery, a battery, a power consumption device, and a method and device for preparing a battery.

BACKGROUND

Energy saving and emission reduction are the key to the sustainable development of the automobile industry. In this case, electric vehicles have become an important part of the sustainable development of the automobile industry because of their advantages of energy saving and environmental friendliness. For the electric vehicles, the battery technology is an important factor related to their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

Embodiments of the present application provide a case of a battery, a battery, a power consumption device, and a method and device for preparing a battery, which could enhance the safety of the battery.

In a first aspect, a case of a battery is provided, the case including: an electrical chamber configured to accommodate a plurality of battery cells and a bus component, the bus component being configured to electrically connect the plurality of battery cells, wherein at least one battery cell of the plurality of battery cells includes a pressure relief mechanism, and the pressure relief mechanism is configured, when an internal pressure or temperature of the battery cell provided with the pressure relief mechanism reaches a threshold, to be actuated to release the internal pressure; a thermal management component configured to accommodate a fluid to adjust temperatures of the plurality of battery cells; and a collection chamber configured to collect, when the pressure relief mechanism is actuated, emissions from the battery cell provided with the pressure relief mechanism; wherein the thermal management component is configured to isolate the electrical chamber from the collection chamber.

According to the technical solution of the embodiment of the present application, the electrical chamber for accommodating the battery cells is separated, by the thermal management component, from the collection chamber for collecting the emissions. When the pressure relief mechanism is actuated, the emissions from the battery cells enter the collection chamber rather than the electrical chamber, or a small amount of the emissions enter the electrical chamber, so that the electrical connection in the electrical chamber is not affected, and therefore the safety of the battery can be enhanced.

In some embodiments, the thermal management component is configured to be capable of being damaged when the pressure relief mechanism is actuated, such that the fluid is discharged from interior of the thermal management component; wherein the collection chamber is further configured to collect emissions of the thermal management component.

When the pressure relief mechanism is actuated, the thermal management component is damaged, and the fluid is discharged from the interior of the thermal management component, such that the emissions from the battery cells can be cooled to reduce the risk resulting from the emissions.

In some embodiments, the thermal management component has a wall shared by the electrical chamber and the collection chamber.

Since the thermal management component has the wall shared by the electrical chamber and the collection chamber, the emissions can be isolated from the electrical chamber as far as possible, thus reducing the risk resulting from the emissions and enhancing the safety of the battery.

In some embodiments, the case further includes a covering with an opening, the thermal management component covers the opening of the covering, and the covering and the thermal management component form the electrical chamber.

In some embodiments, the covering includes a first portion and a second portion provided with openings in two opposite sides respectively, the first portion covers an opening on one side of the second portion, and the thermal management component covers an opening on the other side of the second portion.

In some embodiments, the case further includes: a protective member, the protective member being configured to protect the thermal management component, and the protective member and the thermal management component forming the collection chamber.

The collection chamber formed by the protective member and the thermal management component can effectively collect and buffer the emissions and reduce the risk resulting therefrom.

In some embodiments, the case further includes a closed covering, and the thermal management component is disposed inside the covering and separates interior of the covering into the electrical chamber and the collection chamber.

In some embodiments, the covering includes a first portion and a second portion, one side of the second portion is provided with an opening to form a semi-closed structure, the thermal management component is disposed inside the second portion, and the first portion covers the opening of the second portion.

In some embodiments, the electrical chamber is isolated from the collection chamber by the thermal management component.

The collection chamber is not in communication with the electrical chamber, and liquid or gas, etc. in the collection chamber cannot enter the electrical chamber, so that the electrical chamber can be better protected.

In some embodiments, the thermal management component is provided with a weakened zone, and the weakened zone is configured to be capable of being damaged when the pressure relief mechanism is actuated, such that the emissions from the battery cell provided with the pressure relief mechanism pass through the weakened zone and enter the collection chamber.

The thermal management component is provided with the weakened zone, so that when the pressure relief mechanism is actuated, the emissions can pass through the weakened zone and enter the collection chamber, thus preventing the emissions from entering the electrical chamber; and it can be also ensured that the electrical chamber is isolated from the collection chamber when the pressure relief mechanism is not actuated, thus preventing substances in the collection chamber from entering the electrical chamber.

In some embodiments, the weakened zone is arranged opposite to the pressure relief mechanism. In this way, when the pressure relief mechanism is actuated, the emissions can directly impact and open the weakened zone.

In some embodiments, the thermal management component is provided with a recess arranged opposite to the pressure relief mechanism, and a bottom wall of the recess forms the weakened zone.

In some embodiments, the pressure relief mechanism is disposed at a first wall of the battery cell provided with the pressure relief mechanism, the first wall is attached to the thermal management component, and the recess is disposed on a surface of the thermal management component facing the first wall.

In some embodiments, the thermal management component includes a first thermally conductive plate and a second thermally conductive plate, the first thermally conductive plate is located between the first wall and the second thermally conductive plate and attached to the first wall, a first region of the first thermally conductive plate is recessed toward the second thermally conductive plate to form the recess, and the first region is connected to the second thermally conductive plate.

In some embodiments, the first region is provided with a first through hole, and a radial dimension of the first through hole is less than that of the recess.

In some embodiments, a thickness of the second thermally conductive plate corresponding to the first through hole is less than that of the second thermally conductive plate in other regions. In this way, the weakened zone is more easily damaged by the emissions.

In some embodiments, the weakened zone has a thickness less than or equal to 3 mm.

In some embodiments, the weakened zone has a lower melting point than the rest of the thermal management component.

In some embodiments, a material of the weakened zone has a melting point below 400° C.

In some embodiments, a portion of the thermal management component around the weakened zone is capable of being damaged by the emissions from the battery cell provided with the pressure relief mechanism, such that the fluid is discharged from interior of the thermal management component.

In some embodiments, a side face of the recess is capable of being damaged by the emissions from the battery cell provided with the pressure relief mechanism, such that the fluid is discharged from interior of the thermal management component.

In the case of use of the recess, when the pressure relief mechanism is actuated, the emissions from the battery cell rush into the recess. Since the bottom wall of the recess is relatively weak, the emissions will damage the bottom wall of the recess and enter the collection chamber. In addition, the emissions rushing into the recess also melt the side face of the recess, so that the fluid is discharged from the interior of the thermal management component, thereby cooling the hot emissions.

In some embodiments, a radial dimension of the recess gradually decreases in a direction away from the pressure relief mechanism. This can increase the contact area with the emissions and facilitate the damage by the emissions.

In some embodiments, the recess is configured as an avoidance chamber for enabling the pressure relief mechanism to be opened when the pressure relief mechanism is actuated.

The avoidance chamber provides a deformation space for the pressure relief mechanism, such that the pressure relief mechanism is deformed toward the thermal management component and fractured.

In some embodiments, a depth of the recess is related to a size of the pressure relief mechanism.

In some embodiments, the recess has a depth greater than 1 mm.

In some embodiments, an area of an opening of the recess is related to an area of the pressure relief mechanism.

In some embodiments, a ratio of the area of the opening of the recess to the area of the pressure relief mechanism ranges from 0.5 to 2.

In some embodiments, at least a portion of the pressure relief mechanism protrudes outward from the first wall, and the avoidance chamber is configured to accommodate the at least portion of the pressure relief mechanism.

In some embodiments, a portion of the first wall around the pressure relief mechanism protrudes outward, and the avoidance chamber is configured to accommodate the outward protruding portion of the first wall around the pressure relief mechanism.

In this way, the first wall of the battery cell can be closely attached to the surface of the thermal management component, which facilitates the fixation of the battery cell and can also save space and improve the thermal management efficiency. Moreover, when the pressure relief mechanism is actuated, the emissions from the battery cell can be discharged toward the avoidance chamber and away from the battery cell, thereby reducing the risk resulting from the emissions, so that the safety of the battery can be enhanced.

In some embodiments, the thermal management component is provided with a second through hole, and the second through hole is configured such that the emissions from the battery cell provided with the pressure relief mechanism are capable of entering the collection chamber through the second through hole when the pressure relief mechanism is actuated.

In some embodiments, the second through hole is arranged opposite to the pressure relief mechanism.

In some embodiments, a portion of the thermal management component around the second through hole is capable of being damaged by the emissions from the battery cell provided with the pressure relief mechanism, such that the fluid is discharged from interior of the thermal management component.

In some embodiments, a hole wall of the second through hole is capable of being damaged by the emissions from the battery cell provided with the pressure relief mechanism, such that the fluid is discharged from interior of the thermal management component.

When the pressure relief mechanism is actuated, the emissions from the battery cell rush into the second through hole. Since the emissions have high pressure and high heat, the emissions further melt the hole wall of the second through hole when passing through the second through hole, so that the fluid is discharged from the interior of the thermal management component, thereby cooling the emissions.

In some embodiments, a radial dimension of the second through hole gradually decreases in a direction away from the pressure relief mechanism. This can increase the contact area with the emissions and facilitate the damage by the emissions.

In some embodiments, an area of an opening of the second through hole is related to an area of the pressure relief mechanism.

In some embodiments, a ratio of the area of the opening of the second through hole to the area of the pressure relief mechanism ranges from 0.5 to 2.

In some embodiments, the pressure relief mechanism is disposed at a first wall of the battery cell provided with the pressure relief mechanism, the first wall is attached to the thermal management component, at least a portion of the pressure relief mechanism protrudes outward from the first wall, and the second through hole is configured to accommodate the at least portion of the pressure relief mechanism.

In this way, the first wall of the battery cell can be closely attached to the surface of the thermal management component, which facilitates the fixation of the battery cell and can also save space and improve the thermal management efficiency. Moreover, when the pressure relief mechanism is actuated, the emissions from the battery cell can be discharged toward the second through hole and away from the battery cell, thereby reducing the risk resulting from the emissions, so that the safety of the battery can be enhanced.

In some embodiments, the pressure relief mechanism is disposed at the first wall of the battery cell provided with the pressure relief mechanism, the first wall is attached to the thermal management component, a portion of the first wall around the pressure relief mechanism protrudes outward, and the second through hole is configured to accommodate the outward protruding portion of the first wall around the pressure relief mechanism.

In some embodiments, the pressure relief mechanism is disposed at the first wall of the battery cell provided with the pressure relief mechanism, and a second wall of the battery cell provided with the pressure relief mechanism is provided with electrode terminals and is different from the first wall.

The pressure relief mechanism and the electrode terminals are disposed on different walls of the battery cell, such that when the pressure relief mechanism is actuated, the emissions from the battery cell can be farther away from the electrode terminals, thereby reducing the impact of the emissions on the electrode terminals and the bus component and therefore enhancing the safety of the battery.

In some embodiments, the second wall is arranged opposite to the first wall.

In some embodiments, the pressure relief mechanism is a temperature-sensitive pressure relief mechanism configured to be capable of being melted when the internal temperature of the battery cell provided with the pressure relief mechanism reaches a threshold; and/or the pressure relief mechanism is a pressure-sensitive pressure relief mechanism configured to be capable of being fractured when the internal pressure of the battery cell provided with the pressure relief mechanism reaches a threshold.

In a second aspect, a battery is provided, including: a plurality of battery cells, at least one battery cell of the plurality of battery cells including a pressure relief mechanism, and the pressure relief mechanism being configured, when an internal pressure or temperature of the battery cell provided with the pressure relief mechanism reaches a threshold, to be actuated to release the internal pressure; a bus component configured to electrically connect the plurality of battery cells; and the case provided in the first aspect.

In a third aspect, a power consumption device is provided, including: the battery provided in the second aspect.

In some embodiments, the power consumption device is a vehicle, a ship or a spacecraft.

In a fourth aspect, a method of preparing a battery is provided, the method including: providing a plurality of battery cells, at least one battery cell of the plurality of battery cells including a pressure relief mechanism, and the pressure relief mechanism being configured, when an internal pressure or temperature of the battery cell provided with the pressure relief mechanism reaches a threshold, to be actuated to release the internal pressure; providing a bus component, the bus component being configured to electrically connect the plurality of battery cells; providing a case, the case including: an electrical chamber; a thermal management component configured to accommodate a fluid; and a collection chamber; wherein the thermal management component isolates the electrical chamber from the collection chamber; and accommodating the plurality of battery cells and the bus component in the electrical chamber, wherein the collection chamber collects, when the pressure relief mechanism is actuated, emissions from the battery cell provided with the pressure relief mechanism.

In some embodiments, the thermal management component is capable of being damaged when the pressure relief mechanism is actuated, such that the fluid is discharged from interior of the thermal management component; the collection chamber further collects emissions from the thermal management component.

In some embodiments, the thermal management component has a wall shared by the electrical chamber and the collection chamber.

In some embodiments, the case further includes a covering with an opening, the thermal management component covers the opening of the covering, and the covering and the thermal management component form the electrical chamber.

In some embodiments, the case further includes: a protective member, the protective member being configured to protect the thermal management component, and the protective member and the thermal management component forming the collection chamber.

In a fifth aspect, a device for preparing a battery is provided, the device including modules for executing the method provided in the foregoing fourth aspect.

BRIEF DESCRIPTION OF DRAWINGS

The accompanying drawings described herein are intended to provide a further understanding of the present application, which constitute a part of the present application. Illustrative embodiments of the present application and the description thereof are for explaining the present application and do not constitute an undue limitation of the present application. In the drawings:

FIG. 16 is a schematic diagram of an avoidance chamber of a thermal management component according to an embodiment of the present application;

FIG. 17 is a schematic diagram of a through hole of a thermal management component according to an embodiment of the present application;

FIG. 18 is a schematic structural diagram of a battery according to an embodiment of the present application;

DESCRIPTION OF EMBODIMENTS

Figure 1:
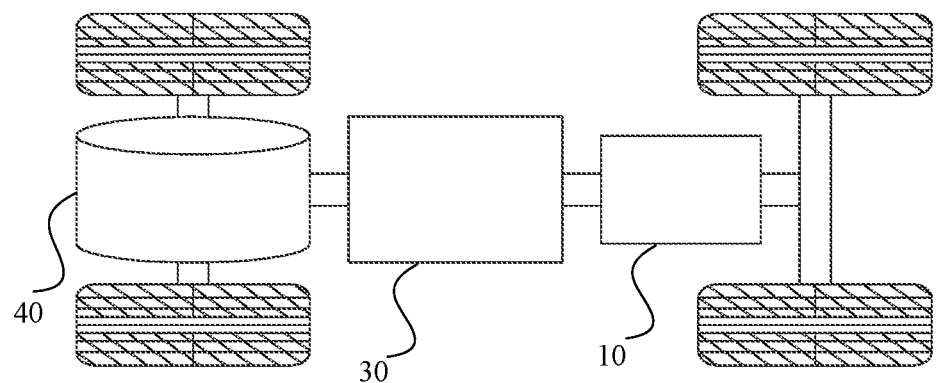
FIG. 1 is a schematic diagram of a vehicle according to an embodiment of the present application.

In order to make objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "I" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which is not limited by the embodiments of the present application. The battery cell is generally grouped into three types according to the way of packaging: a cylindrical battery cell, a prismatic battery cell and a pouch battery cell, which is not limited by the embodiments of the present application.

A battery mentioned in the embodiments of the present application refers to a single physical module including one or more battery cells to provide a higher voltage and capacity. For example, the battery mentioned in the present application may include a battery module or a battery pack, etc. The battery generally includes a case for enclosing one or more battery cells. The case can prevent liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet.

The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. The material of the isolation film may be PP or PE, etc. In addition, the electrode assembly may have a coiled structure or a laminated structure, and the embodiments of the present application are not limited thereto.

With the development of the battery technology, it is necessary to consider many design factors, such as energy density, cycle life, discharge capacity, C-rate and other performance parameters. In addition, the safety of the battery should also be considered.

With respect to the battery cell, the main safety hazards come from the charging and discharging processes, and a suitable environmental temperature design is also required. In order to effectively avoid unnecessary losses, at least triple protection measures are generally taken for the battery cell. Specifically, the protection measures include at least a switching element, a properly selected isolation film material and a pressure relief mechanism. The switching element refers to an element that can stop the charging or discharging of the battery when the temperature or resistance in the battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated to release an internal pressure or temperature when the internal pressure or temperature of the battery cell reaches a predetermined threshold. The threshold design is different according to different design requirements. The threshold may depend on the material of one or more of the positive electrode sheet, the negative electrode sheet, the electrolytic solution and the isolation film in the battery cell. The pressure relief mechanism may take the form of an anti-explosion valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for releasing the internal pressure or temperature.

The "actuation" mentioned in the present application means that the pressure relief mechanism acts or is activated to a certain state, such that the internal pressure and temperature of the battery cell can be released. The action executed by the pressure relief mechanism may include but is not limited to: at least a portion of the pressure relief mechanism being fractured, broken, torn or opened, etc. When the pressure relief mechanism is actuated, high-temperature and high-pressure substances inside the battery cell are discharged outwards from an actuated position as emissions. In this way, the pressure and temperature in the battery cell can be released at a controllable pressure or temperature, thereby avoiding potential, more serious accidents.

The emissions from the battery cell mentioned in the present application include but are not limited to: the electrolytic solution, dissolved or split positive and negative electrode sheets, fragments of the isolation film, high-temperature and high-pressure gas generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. However, in order to ensure an output voltage or current of the battery, a plurality of battery cells are often required and electrically connected to each other via a bus component. The emissions discharged from the interior of a battery cell may cause short circuit of the other battery cells. For example, when discharged metal scraps electrically connect two bus components, the battery may be short-circuited, thereby posing a potential safety hazard. Moreover, the high-temperature and high-pressure emissions are discharged in a direction of the pressure relief mechanism provided in the battery cell, and more specifically, may be discharged in a direction of a region where the pressure relief mechanism is actuated. The strength and destructive power of such emissions may be great, or may even be enough to break through one or more structures in this direction, causing further safety problems.

In view of this, the present application provides a technical solution in which interior of a case of a battery is separated by a thermal management component into an electrical chamber for accommodating battery cells and a collection chamber for collecting emissions. When a pressure relief mechanism is actuated, emissions from a battery cell enter the collection chamber, but do not enter the electrical chamber or only a small amount of the emissions enter the electrical chamber, thereby reducing the impact of the emissions on a bus component in the electrical chamber, so that the safety of the battery can be enhanced. In addition, since the emissions from the battery cell are collected with the collection chamber, the high-temperature and high-pressure emissions are buffered and the pressure and temperature of the emissions are reduced. This reduces the destructive power of the emissions to other structures, thereby further enhancing the safety of the battery.

The thermal management component is configured to accommodate a fluid to adjust temperatures of a plurality of battery cells. The fluid here may be liquid or gas, and temperature adjustment means heating or cooling the plurality of battery cells. In the case of cooling or lowering the temperatures of the battery cells, the thermal management component is configured to accommodate a cooling fluid to lower the temperatures of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component can also be used for heating to raise the temperatures of the plurality of battery cells, which is not limited by the embodiments of the present application. Optionally, the fluid can flow in a circulating manner to achieve better temperature adjustment effects. Optionally, the fluid may be water, a mixture of water and ethylene glycol, or air, etc.

The electrical chamber is configured to accommodate the plurality of battery cells and the bus component. The electrical chamber may be sealed or unsealed. The electrical chamber provides an installation space for the battery cells and the bus component. In some embodiments, a structure configured to fix the battery cells may also be provided in the electrical chamber. The shape of the electrical chamber may be determined according to the plurality of battery cells and the bus component which are accommodated therein. In some embodiments, the electrical chamber may be a cube with six walls. Since the battery cells in the electrical chamber form higher voltage output through electrical connection, the electrical chamber may also be called a "high-voltage chamber".

The bus component is configured to implement the electric connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Corresponding to the "high-voltage chamber", the electrical connection formed by the bus component may also be called "high-voltage connection".

The collection chamber is configured to collect the emissions and may be sealed or unsealed. In some embodiments, the collection chamber may contain air or another gas. In the collection chamber there is no electrical connection to the voltage output. Corresponding to the "high-voltage chamber", the collection chamber may also be called a "low-voltage chamber". Optionally, or additionally, the collection chamber may also contain liquid, such as a cooling medium, or a component for accommodating the liquid may also be provided in the collection chamber to further cool the emissions entering the collection chamber. Further, optionally, the gas or the liquid in the collection chamber flows in a circulating manner.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel vehicle, a gas vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 can be used not only as an operation power supply of the vehicle 1, but also as a driving power supply of the vehicle 1, replacing or partially replacing fuel or natural gas to provide driving power for the vehicle 1.

In order to meet different power requirements, the battery may include a plurality of battery cells, wherein the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
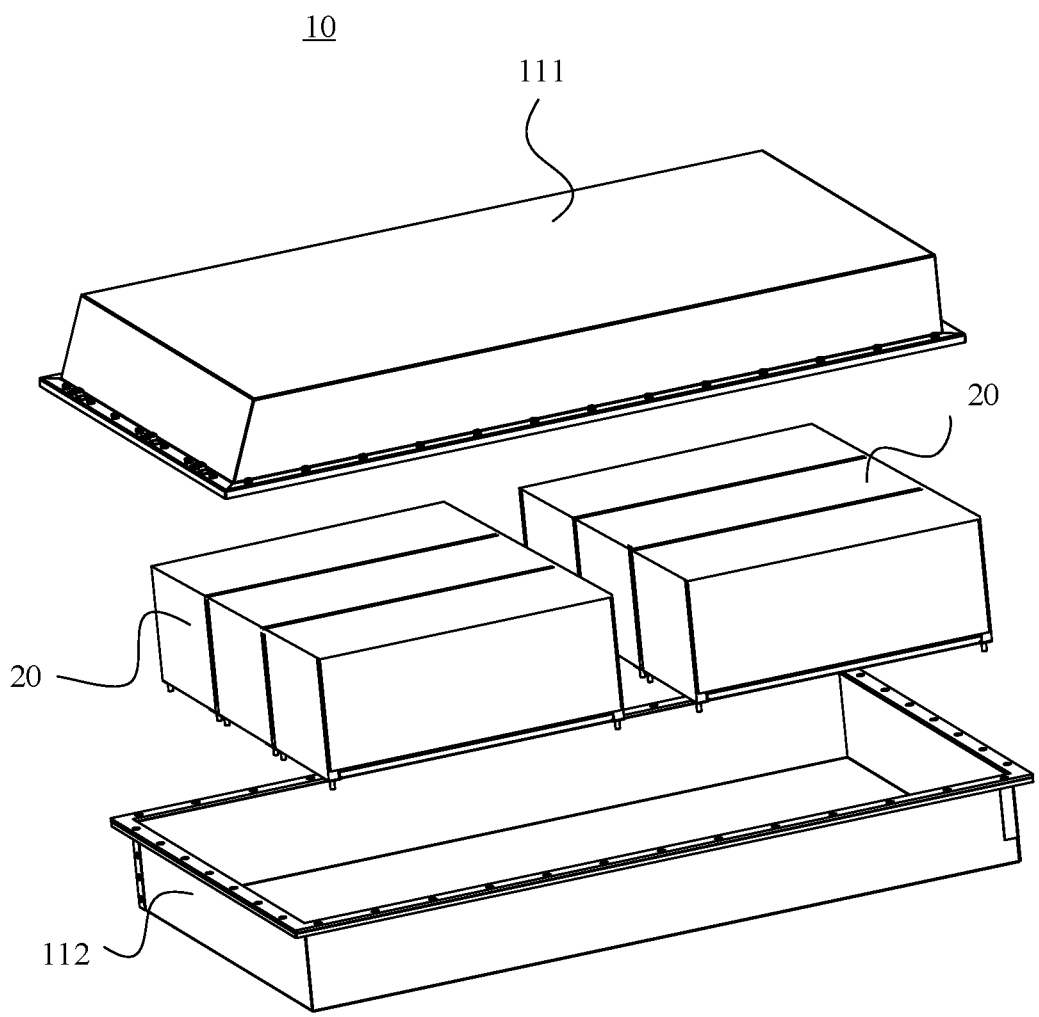
FIG. 2 is a schematic structural diagram of a battery according to an embodiment of the present application.

For example, as shown in FIG. 2, which is a schematic structural diagram of a battery 10 according to an embodiment of the present application, the battery 10 may include a plurality of battery cells 20. The battery 10 may further include a case (or a covering) with the interior thereof being a hollow structure, and the plurality of battery cells 20 are accommodated in the case. As shown in FIG. 2, the case may include two portions, which are referred to as a first portion 111 and a second portion 112, respectively, and the first portion 111 and the second portion 112 are fastened together. The shapes of the first portion 111 and the second portion 112 may be determined according to the shape of the combined plurality of battery cells 20, and the first portion 111 and the second portion 112 may each have an opening. For example, the first portion 111 and the second portion 112 each may be a hollow cuboid and each have only one surface with an opening, and the opening of the first portion 111 is arranged opposite to the opening of the second portion 112. The first portion 111 and the second portion 112 are fastened to each other to form a case with a closed chamber. The plurality of battery cells 20 are combined in parallel connection or series connection or series-parallel connection and are then placed in the case formed by fastening the first portion 111 to the second portion 112.

Optionally, the battery 10 may also include other structures, which will not be described in detail herein. For example, the battery 10 may also include a bus component. The bus component is configured to implement the electric connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

Figure 3:
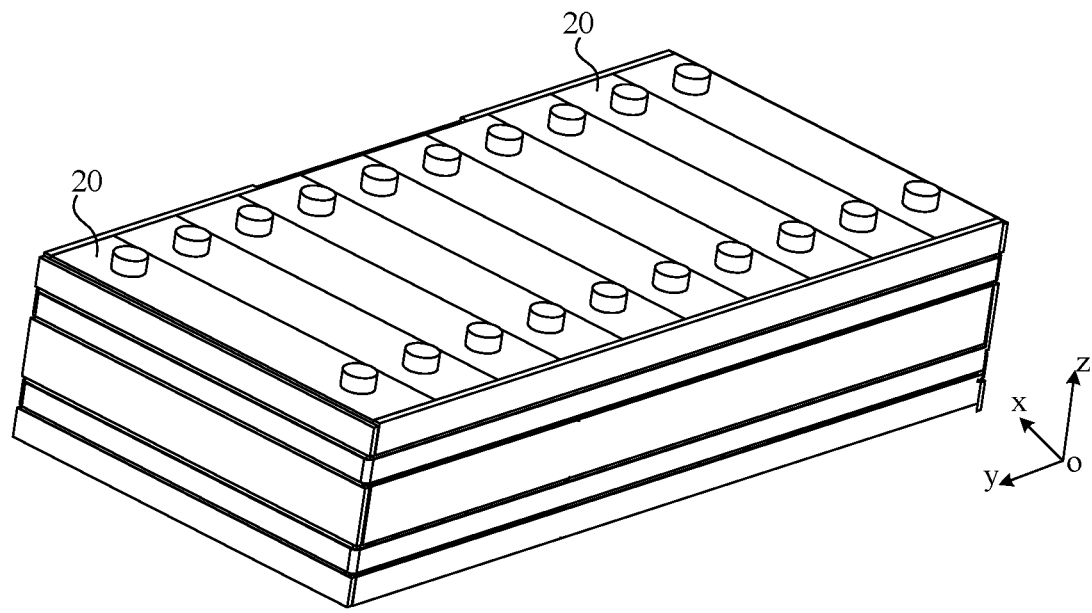
FIG. 3 is a schematic structural diagram of a battery module according to an embodiment of the present application.
Figure 4:
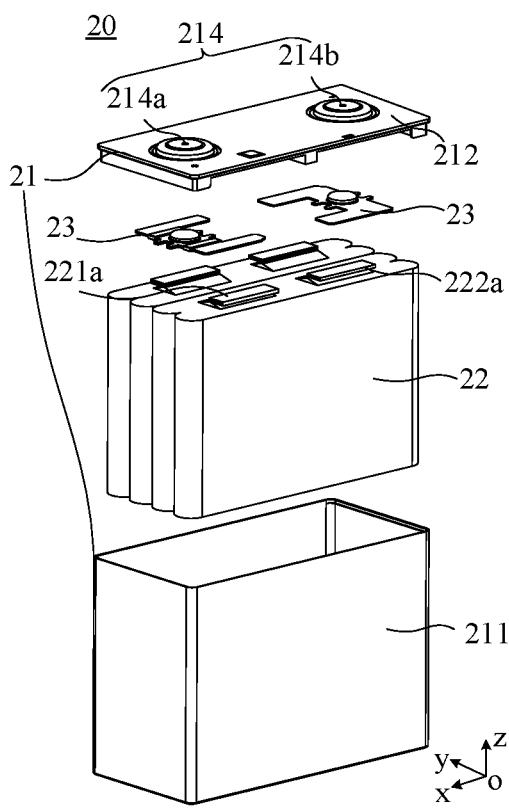
FIG. 4 is an exploded view of a battery cell according to an embodiment of the present application.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of battery cells 20 included in the battery module is not limited and may be set as required. For example, FIG. 3 shows an example of a battery module. The battery may include a plurality of battery modules, and these battery modules may be connected in series, in parallel or in series and parallel. FIG. 4 is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, and the second electrode tab 222a of one or more electrode assemblies 22 is connected to the other electrode terminal via the other connecting member 23. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

Figure 5:
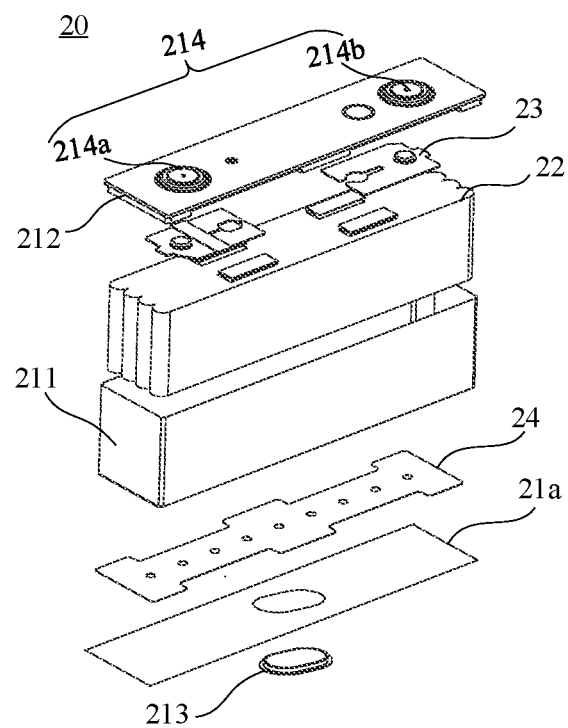
FIG. 5 is an exploded view of a battery cell according to another embodiment of the present application.

A schematic structural diagram of a battery cell 20 including a pressure relief mechanism 213 according to another embodiment of the present application is shown in FIG. 5.

The housing 211, the cover plate 212, the electrode assembly 22 and the connecting member 23 in FIG. 5 are consistent with the housing 211, the cover plate 212, the electrode assembly 22 and the connecting member 23 in FIG. 4, which will not be repeated here for brevity.

One wall of the battery cell 20, such as a first wall 21a shown in FIG. 5, may be further provided with a pressure relief mechanism 213. For convenience of display, the first wall 21a is separated from the housing 211 in FIG. 5, but this does not specify that a bottom side of the housing 211 has an opening. The pressure relief mechanism 213 is configured, when an internal pressure or temperature of the battery cell 20 reaches a threshold, to be actuated to release the internal pressure or temperature.

The pressure relief mechanism 213 may be a portion of the first wall 21a or is split from the first wall 21a and fixed to the first wall 21a by means of welding, for example. When the pressure relief mechanism 213 is a portion of the first wall 21a, e.g., the pressure relief mechanism 213 can be formed by providing an indentation on the first wall 21a, and the thickness of the first wall 21a corresponding to the indentation is less than that of other regions of the pressure relief mechanism 213 except the indentation. The indentation is the weakest position of the pressure relief mechanism 213. When excessive gas generated by the battery cell 20 causes the internal pressure of the housing 211 to rise and reach a threshold, or the internal temperature of the battery cell 20 rises and reaches a threshold due to the heat generated by the internal reaction of the battery cell 20, the pressure relief mechanism 213 can be fractured at the indentation, resulting in the communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 5, in the case where the pressure relief mechanism 213 is provided at the first wall 21a of the battery cell 20, a second wall of the battery cell 20 is provided with electrode terminals 214 and is different from the first wall 21a.

Optionally, the second wall is arranged opposite to the first wall 21a. For example, the first wall 21a may be a bottom wall of the battery cell 20, and the second wall may be a top wall of the battery cell 20, i.e., the cover plate 212.

Optionally, as shown in FIG. 5, the battery cell 20 may also include a backing plate 24. The backing plate 24 is located between the electrode assembly 22 and the bottom wall of the housing 211, can support the electrode assembly 22, and can also effectively prevent the electrode assembly 22 from interfering with rounded corners around the bottom wall of the housing 211. In addition, the backing plate 24 may be provided with one or more through holes, e.g., the backing plate may be provided with a plurality of uniformly arranged through holes, or when the pressure relief mechanism 213 is provided on the bottom wall of the housing 211, through holes are formed at positions corresponding to the pressure relief mechanism 213 for facilitating the guiding of liquid and gas. Specifically, this can communicate spaces of an upper surface and a lower surface of the backing plate 24, and gas generated inside the battery cell 20 and the electrolytic solution can freely pass through the backing plate 24.

The pressure relief mechanism 213 and the electrode terminals 214 are provided on different walls of the battery cell 20, such that when the pressure relief mechanism 213 is actuated, the emissions from the battery cell 20 can be farther away from the electrode terminals 214, thereby reducing the impact of the emissions on the electrode terminals 214 and the bus component and therefore enhancing the safety of the battery.

Further, when the electrode terminals 214 are provided on the cover plate 212 of the battery cell 20, the pressure relief mechanism 213 is provided on the bottom wall of the battery cell 20, such that when the pressure relief mechanism 213 is actuated, the emissions from the battery cell 20 can are discharged to the bottom of the battery 10. In this way, the risk resulting from the emissions can be reduced by using the thermal management component at the bottom of the battery 10, and the harm to users can be reduced because the bottom of the battery 10 is usually far away from the users.

The pressure relief mechanism 213 may have various possible pressure relief structures, which is not limited by the embodiments of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when the internal pressure of the battery cell 20 provided with the pressure relief mechanism 213 reaches a threshold.

Figure 6:
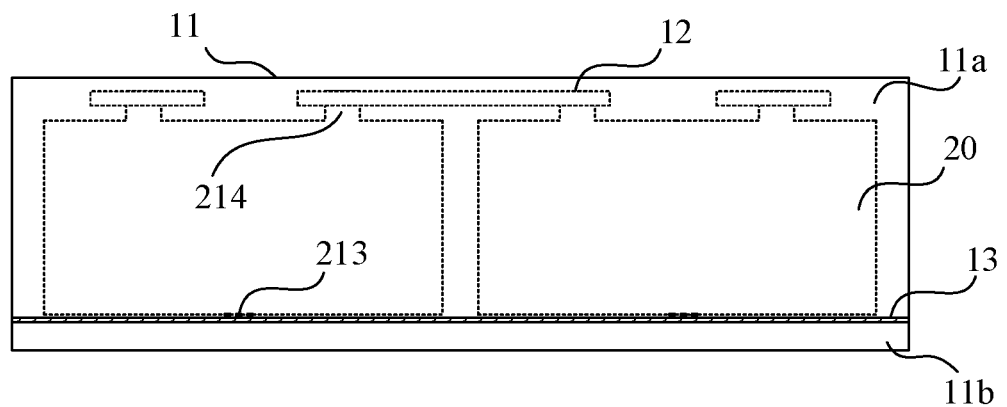
FIGS. 6-11 are schematic structural diagrams of cases according to some embodiments of the present application.

FIG. 6 is a schematic structural diagram of a case 11 of a battery according to an embodiment of the present application. As shown in FIG. 6, the case 11 may include an electrical chamber 11a, a collection chamber 11b, and a thermal management component 13. The thermal management component 13 is configured to isolate the electrical chamber 11a from the collection chamber 11b. The so-called "isolate" here refers to separate, which may or may not be sealed.

The electrical chamber 11a is configured to accommodate a plurality of battery cells 20 and a bus component 12. The electrical chamber 11a provides an accommodation space for the battery cells 20 and the bus component 12, and the electrical chamber 11a may be shaped according to the plurality of battery cells 20 and the bus component 12.

The bus component 12 is configured to electrically connect the plurality of battery cells 20. The bus component 12 may implement the electrical connection between the battery cells 20 by connecting electrode terminals 214 of the battery cells 20.

At least one battery cell 20 of the plurality of battery cells 20 may include a pressure relief mechanism 213. The pressure relief mechanism 213 is configured, when an internal pressure or temperature of the battery cell 20 provided with the pressure relief mechanism 213 reaches a threshold, to be actuated to release the internal pressure or temperature.

For convenience of description, the battery cell 20 referred to in the following description of the pressure relief mechanism 213 refers to the battery cell 20 provided with the pressure relief mechanism 213. For example, the battery cell 20 may be the battery cell 20 in FIG. 5.

The thermal management component 13 is configured to accommodate a fluid to adjust temperatures of the plurality of battery cells 20. In the case of lowering the temperatures of the battery cells 20, the thermal management component 13 may accommodate a cooling medium to adjust the temperatures of the plurality of battery cells 20. In this case, the thermal management component 13 may also be called a cooling component, a cooling system or a cooling plate, etc. In addition, the thermal management component 13 can also be used for heating, which is not limited by the embodiments of the present application. Optionally, the fluid can flow in a circulating manner to achieve better temperature adjustment effects.

The collection chamber 11b is configured to collect the emissions from the battery cell 20 provided with the pressure relief mechanism 213 when the pressure relief mechanism 213 is actuated.

In the embodiment of the present application, the thermal management component 13 is used to isolate the electrical chamber 11a from the collection chamber 11b. That is, the electrical chamber 11a for accommodating the plurality of battery cells 20 and the bus component 12 is separated from the collection chamber 11b for collecting the emissions. In this way, when the pressure relief mechanism 213 is actuated, the emissions from the battery cell 20 enter the collection chamber 11b rather than the electrical chamber, or a small amount of the emissions enter the electrical chamber 11a, so that the electrical connection in the electrical chamber 11a is not affected, and therefore the safety of the battery can be enhanced.

Optionally, in an embodiment of the present application, the thermal management component 13 has a wall shared by the electrical chamber 11a and the collection chamber 11b. As shown in FIG. 6, the thermal management component 13 may be both a wall of the electrical chamber 11a and a wall of the collection chamber 11b. That is, the thermal management component 13 (or a portion thereof) can be directly used as a wall shared by the electrical chamber 11a and the collection chamber 11b. In this way, the emissions from the battery cell 20 can enter the collection chamber 11b through the thermal management component 13. Besides, due to the existence of the thermal management component 13, the emissions can be isolated from the electrical chamber 11a as far as possible, thus reducing the risk resulting from the emissions and enhancing the safety of the battery.

Figure 7:
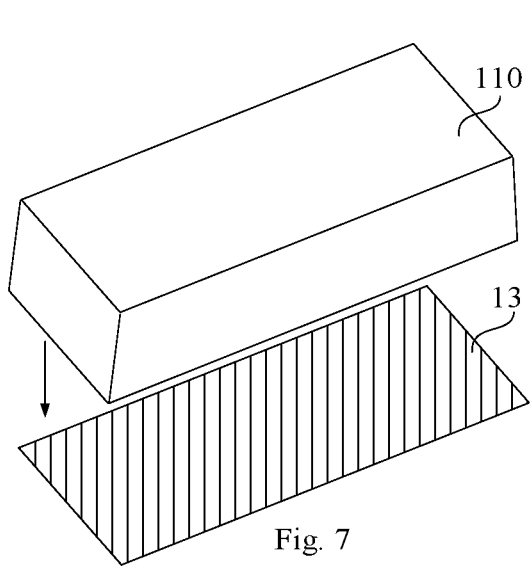

Optionally, in an embodiment of the present application, the electrical chamber 11a may be composed of a covering having an opening, and a thermal management component 13. For example, as shown in FIG. 7, the case 11 further includes a covering 110 having an opening (an opening on the lower side in FIG. 7). The covering 110 with the opening is a semi-closed chamber with an opening in communication with the outside, and the thermal management component 13 covers the opening to form a chamber, i.e., an electrical chamber 11a.

Figure 8:
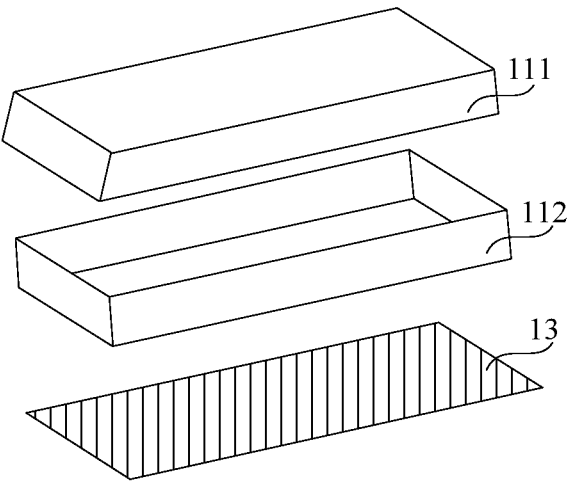

Optionally, the covering 110 may be composed of multiple portions. For example, as shown in FIG. 8, the covering 110 may include a first portion 111 and a second portion 112. Two sides of the second portion 112 have openings, respectively. The first portion 111 covers the opening on one side of the second portion 112, and the thermal management component 13 covers the opening on the other side of the second portion 112, thus forming the electrical chamber 11a.

The embodiment of FIG. 8 may be obtained through improvements on the basis of FIG. 2. Specifically, a bottom wall of the second portion 112 in FIG. 2 may be replaced with the thermal management component 13, and the thermal management component 13 acts as a wall of the electrical chamber 11a, thus forming the electrical chamber 11a in FIG. 8. In other words, the bottom wall of the second portion 112 in FIG. 2 can be removed. That is, an annular wall with two opening sides is formed, and the first portion 111 and the thermal management component 13 cover the openings on the two sides of the second portion 112 respectively to form a chamber, namely an electrical chamber 11a.

Figure 9:
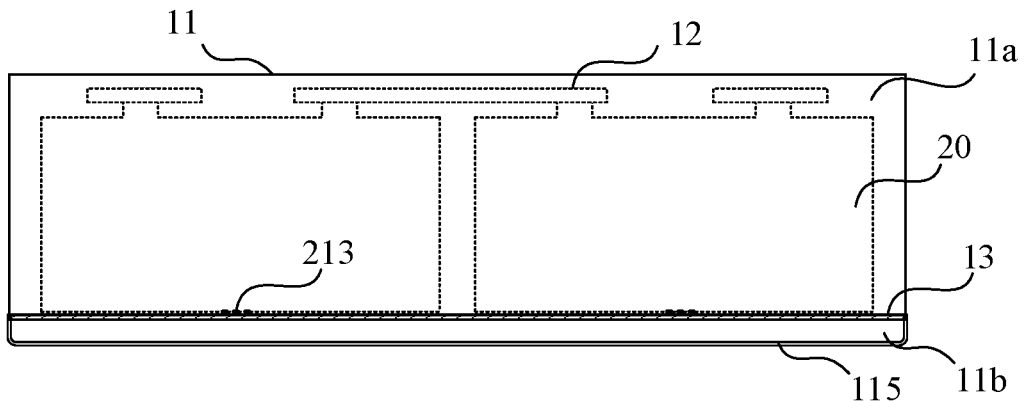

Optionally, in an embodiment of the present application, the collection chamber 11b may be composed of a thermal management component 13 and a protective member. For example, as shown in FIG. 9, the case 11 further includes a protective member 115. The protective member 115 is configured to protect the thermal management component 13, and the protective member 115 and the thermal management component 13 form the collection chamber 11b.

The collection chamber 11b formed by the protective member 115 and the thermal management component 13 does not occupy the space that may accommodate the battery cells 20. Therefore, the collection chamber 11b with a larger space therein can be provided, which may effectively collect and buffer the emissions and reduce the risk resulting therefrom.

Optionally, in an embodiment of the present application, a fluid, such as a cooling medium, or a component for accommodating the fluid, may be further provided in the collection chamber 11b to further cool the emissions entering the collection chamber 11b.

Optionally, in an embodiment of the present application, the collection chamber 11b may be a sealed chamber. For example, the connection between the protective member 115 and the thermal management component 13 may be sealed by a sealing member.

Optionally, in an embodiment of the present application, the collection chamber 11b may not be a sealed chamber. For example, the collection chamber 11b may be in communication with the air, so that part of the emissions can be further discharged to the outside of the case 11.

In the foregoing embodiment, the thermal management component 13 covers the opening of the covering 110 to form an electrical chamber 11a, and the thermal management component 13 and the protective member 115 form the collection chamber 11b. Optionally, the thermal management component 13 may also directly separate the closed covering into the electrical chamber 11a and the collection chamber 11b.

Figure 10:
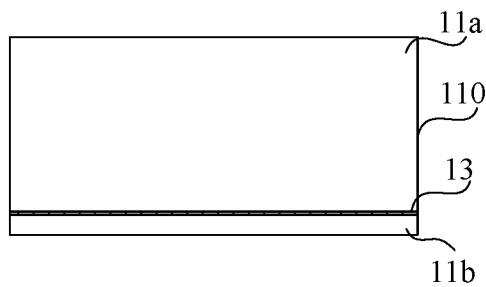

For example, as shown in FIG. 10, in an embodiment of the present application, the case 11 further includes a closed covering 110. The thermal management component 13 is provided inside the covering 110 and separates the interior of the covering 110 into the electrical chamber 11a and the collection chamber 11b. That is, the closed covering 110 internally forms a chamber, and the thermal management component 13 separates the chamber inside the covering 110 into two chambers, namely the electrical chamber 11a and the collection chamber 11b.

Since the electrical chamber 11a needs a relatively large space to accommodate a plurality of battery cells 20, etc., the thermal management component 13 may be provided near a certain wall of the covering 110 to isolate the electrical chamber 11a with a relatively large space from the collection chamber 11b with a relatively small space.

Figure 11:
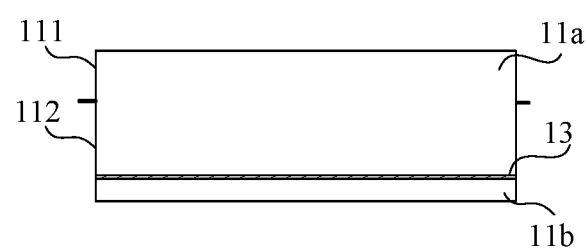

Optionally, as shown in FIG. 11, in an embodiment of the present application, the covering 110 may include a first portion 111 and a second portion 112. A side of the second portion 112 has an opening to form a semi-closed structure. The semi-closed structure is a chamber with an opening. The thermal management component 13 is provided inside the second portion 112, and the first portion 111 covers the opening of the second portion 112. In other words, the thermal management component 13 can be first placed in the semi-closed second portion 112 to isolate the collection chamber 11b, and then the first portion 111 covers the opening of the second portion 112 to form the electrical chamber 11a.

Optionally, in an embodiment of the present application, the electrical chamber 11a is isolated from the collection chamber 11b by the thermal management component 13. That is, the collection chamber 11b is not in communication with the electrical chamber 11a, and liquid or gas, etc. in the collection chamber 11b cannot enter the electrical chamber 11a, so that the electrical chamber 11a can be better protected.

When the pressure relief mechanism 213 is actuated, the pressure relief mechanism 213 is opened to discharge the emissions from the battery cell 20. The emissions may damage the thermal management component 13, and thus pass through the thermal management component 13 and enter the collection chamber 11b.

Figure 12:
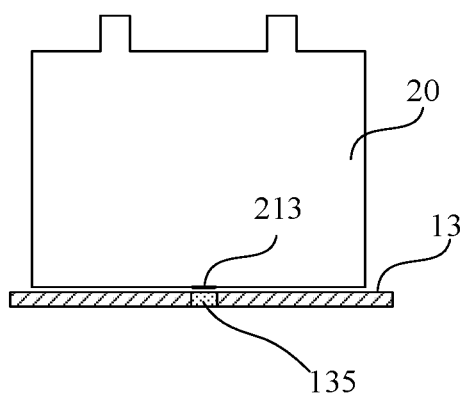
FIG. 12 is a schematic diagram of a weakened zone of a thermal management component according to an embodiment of the present application.

Optionally, as shown in FIG. 12, in an embodiment of the present application, in order to facilitate the passage of the emissions through the thermal management component 13, the thermal management component 13 is provided with a weakened zone 135. The weakened zone 135 is configured to be capable of being damaged when the pressure relief mechanism 213 is actuated, such that the emissions from the battery cell 20 provided with the pressure relief mechanism 213 pass through the weakened zone 135 and enter the collection chamber 11b.

Optionally, the weakened zone 135 may be arranged opposite to the pressure relief mechanism 213. In this way, when the pressure relief mechanism 213 is actuated, the emissions can directly impact the weakened zone 135 to open the weakened zone 135.

The weakened zone 135 can adopt various arrangements that facilitate the damage by the emissions, which is not limited by the embodiments of the present application, and will be illustrated by way of example below.

Figure 13:
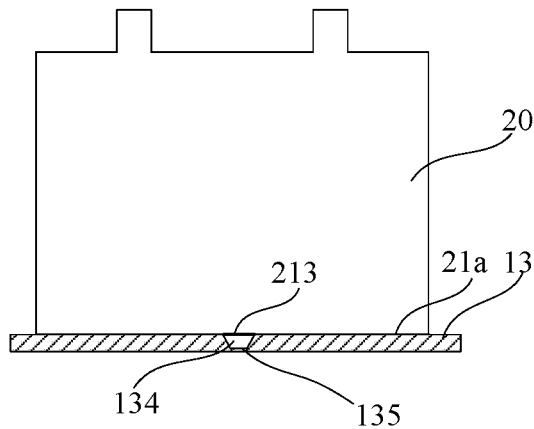
FIG. 13 is a schematic diagram of a recess of a thermal management component according to an embodiment of the present application.

Optionally, as shown in FIG. 13, in an embodiment of the present application, the thermal management component 13 is provided with a recess 134 arranged opposite to the pressure relief mechanism 213, and a bottom wall of the recess 134 forms the weakened zone 135. Since the bottom wall of the recess 134 is weaker than other regions of the thermal management component 13, the bottom wall is easily damaged by the emissions. When the pressure relief mechanism 213 is actuated, the emissions can damage the bottom wall of the recess 134 and enter the collection chamber 11b.

Optionally, the pressure relief mechanism 213 is provided at a first wall 21a of the battery cell 20 provided with the pressure relief mechanism 213, the first wall 21a is attached to the thermal management component 13, and the recess 134 is provided on a surface of the thermal management component 13 facing the first wall 21a. That is, an opening surface of the recess 134 faces the first wall 21a.

It should be understood that the opening of the recess 134 may also face away from the first wall 21a. In this case, the bottom wall of the recess 134 is also easily damaged by the emissions.

The thermal management component 13 can form a fluid flow channel from a thermally conductive material. The fluid flows in the flow channel and conducts heat through the thermally conductive material to lower the temperature of the battery cell 20. Optionally, the weakened zone 135 may have only the thermally conductive material but no fluid, so as to form a relatively thin thermally conductive material layer, which is easily damaged by the emissions. For example, the bottom wall of the recess 134 may be a thin thermally conductive material layer to form the weakened zone 135.

Figure 14A:
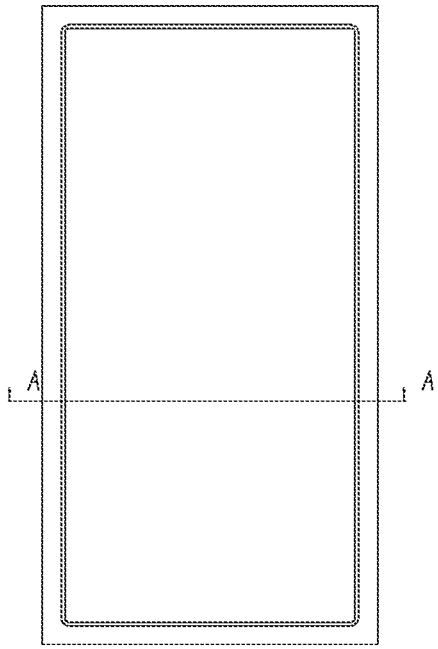
FIG. 14a is a schematic plan view of a case of a battery according to an embodiment of the present application.
Figure 14B:
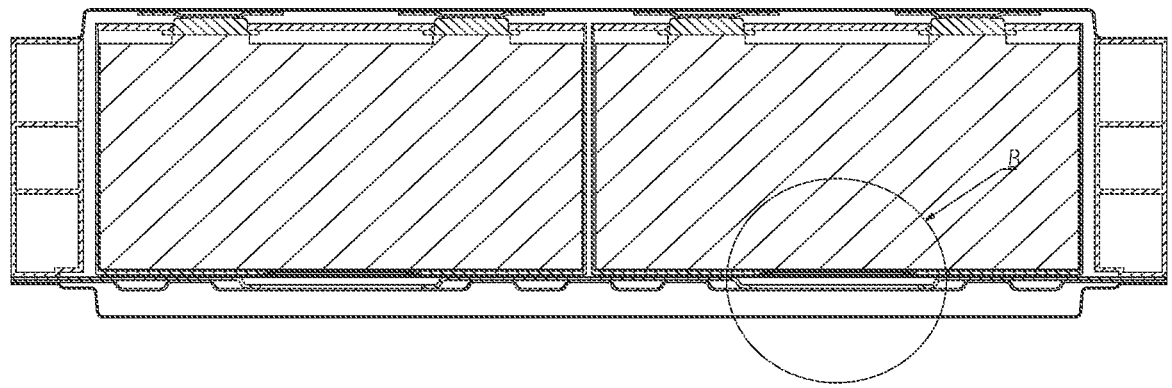
FIG. 14b is a schematic diagram of a cross section of the case of FIG. 14a taken along A-A.
Figure 14C:
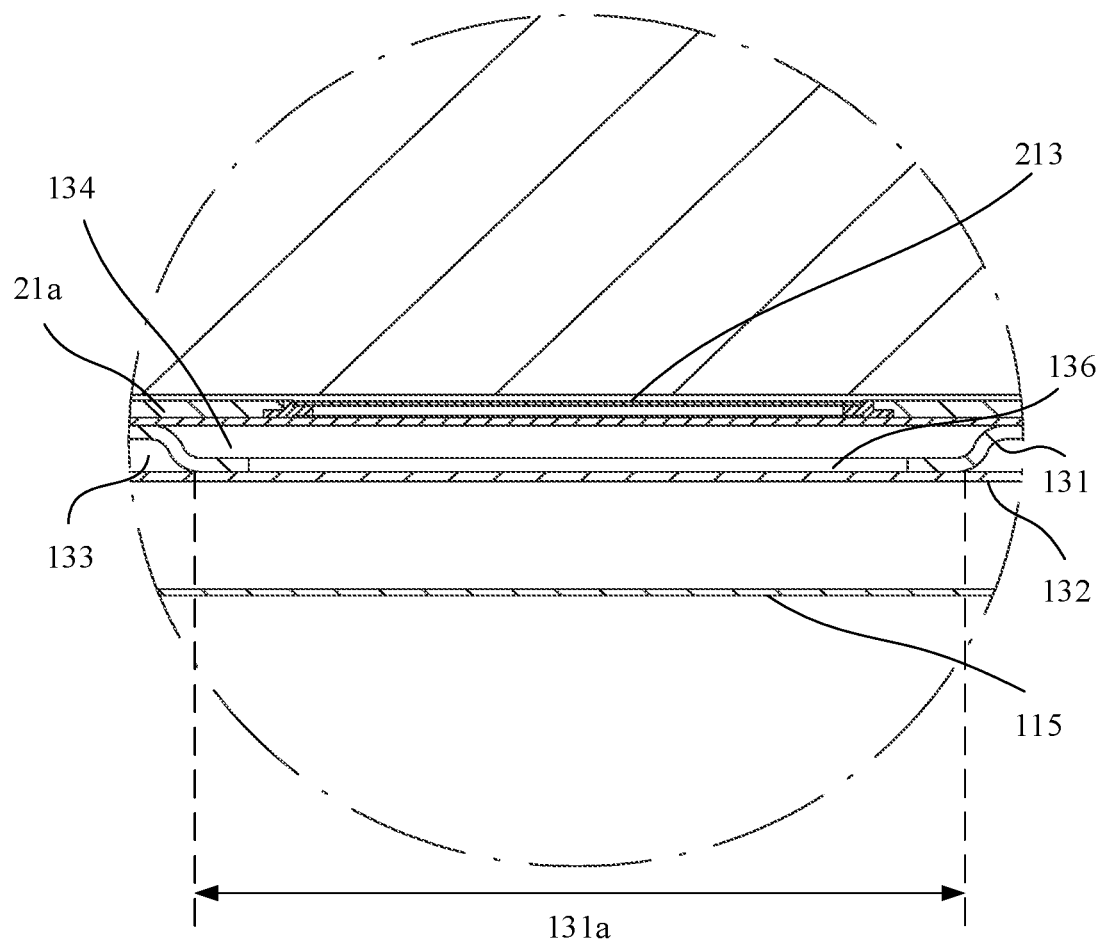
FIG. 14c is an enlarged view of a part B of the case shown in FIG. 14b.

Optionally, as shown in FIGS. 14a to 14c, in an embodiment of the present application, the thermal management component 13 may include a first thermally conductive plate 131 and a second thermally conductive plate 132. The first thermally conductive plate 131 and the second thermally conductive plate 132 form a flow channel 133 for accommodating a fluid. The first thermally conductive plate 131 is located between the first wall 21a and the second thermally conductive plate 132 and is attached to the first wall 21a. A first region 131a of the first thermally conductive plate 131 is recessed toward the second thermally conductive plate 132 to form a recess 134, and the first region 131a is connected to the second thermally conductive plate 132. In this way, a flow channel 133 is formed around the recess 134, while no flow channel is formed in the bottom wall of the recess 134, thus forming a weakened zone.

Optionally, the first thermally conductive plate 131 or the second thermally conductive plate 132 at the bottom wall of the recess 134 may also be removed to form a thinner weakened zone. For example, as shown in FIG. 14c, in an embodiment of the present application, the first region 131a is provided with a first through hole 136, and a radial dimension of the first through hole 136 is less than that of the recess 134. That is, the first thermally conductive plate 131 at the bottom wall of the recess 134 is removed, and the connection between the first thermally conductive plate 131 and the second thermally conductive plate 132 is remained at the bottom edge of the recess 134 to form a flow channel 133 around the recess 134.

Optionally, the second thermally conductive plate 132 corresponding to the first through hole 136 may also be thinned. That is, the thickness of the second thermally conductive plate 132 corresponding to the first through hole 136 is less than that of the second thermally conductive plate 132 in other regions, such that the weakened zone is more easily damaged by the emissions. Optionally, a weakened recess may also be provided on the second thermally conductive plate 132 corresponding to the first through hole 136.

Figure 15A:
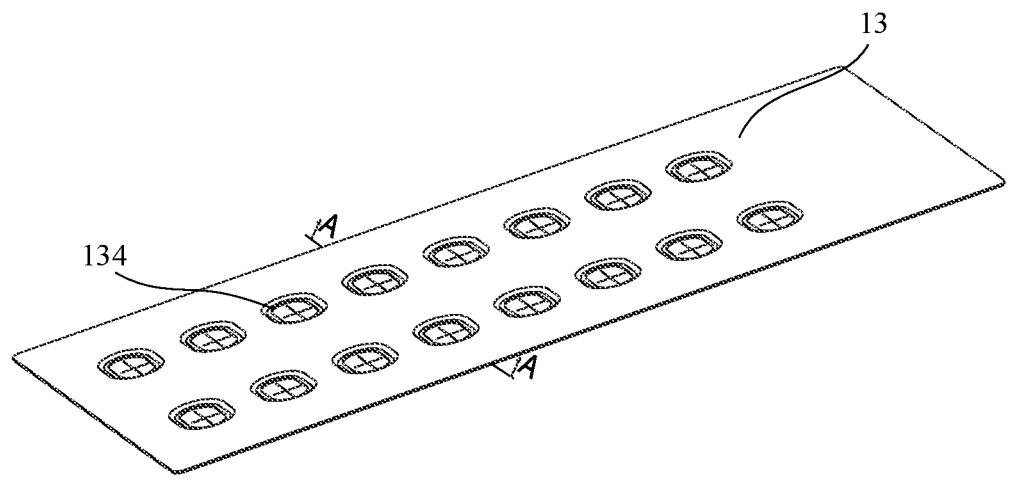
FIG. 15a is a schematic perspective view of a thermal management component according to an embodiment of the present application.
Figure 15B:
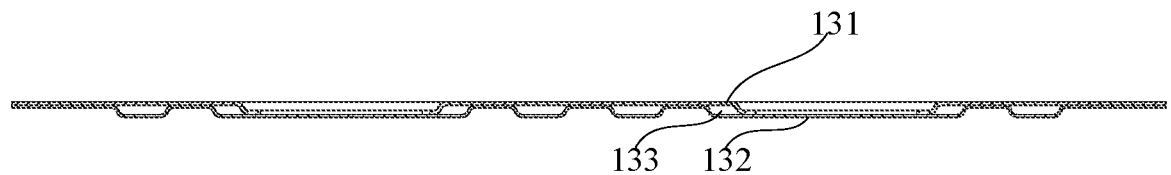
FIG. 15b is a schematic diagram of a cross section of the thermal management component of FIG. 15a taken along A-A.
Figure 15C:
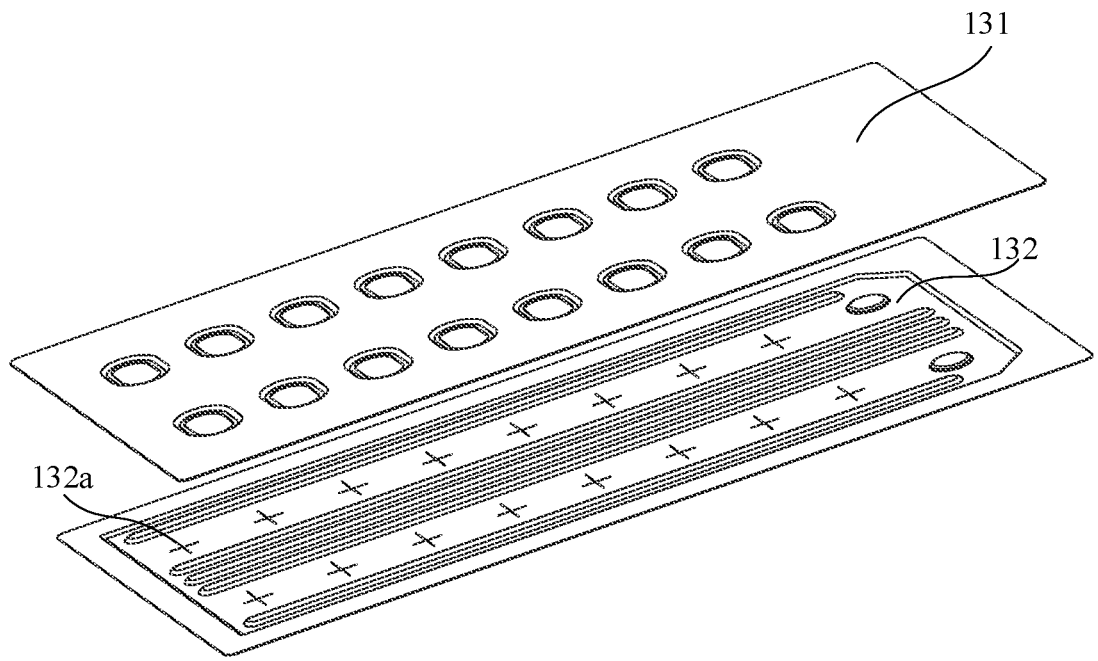
FIG. 15c is an exploded view of a thermal management component according to an embodiment of the present application.

FIGS. 15a to 15c show schematic diagrams of the thermal management component 13. As shown in FIGS. 15a to 15c, the first thermally conductive plate 131 is recessed to form a recess 134, and a region of the second thermally conductive plate 132 corresponding to the recess 134 has no flow channel and is provided with a weakened recess 132a. In this way, after the first thermally conductive plate 131 and the second thermally conductive plate 132 are connected to each other, a weakened zone is formed at the bottom wall of the recess 134.

It should be understood that the bottom wall of the recess 134 can be thinned by other thinning methods. For example, a blind hole or a stepped hole may be formed in the first region 131a of the first thermally conductive plate 131; and/or a blind hole is formed in the second thermally conductive plate 132.

Optionally, in an embodiment of the present application, the weakened zone 135 has a thickness less than or equal to 3 mm. For example, the weakened zone 135 may have a thickness of 1 mm or less.

In addition to the weakened zone 135 with a smaller thickness, a weakened zone 135 made of a low-melting-point material may also be used to facilitate the melting thereof by the emissions. That is, the weakened zone 135 can have a lower melting point than the rest of the thermal management component 13. For example, the material of the weakened zone 135 has a melting point below 400° C.

It should be understood that the weakened zone 135 may be configured to be made of a low-melting-point material and have a smaller thickness. That is, the foregoing two implementations may be implemented alone or in combination.

The thermal management component 13 is provided with the weakened zone 135, so that when the pressure relief mechanism 213 is actuated, the emissions can pass through the weakened zone 135 and enter the collection chamber 11b, thus preventing the emissions from entering the electrical chamber 11a; and it can be also ensured that the electrical chamber 11a is isolated from the collection chamber 11b when the pressure relief mechanism 213 is not actuated, thus preventing substances in the collection chamber 11b from entering the electrical chamber 11a.

Optionally, in an embodiment of the present application, the thermal management component 13 is configured to be capable of being damaged when the pressure relief mechanism 213 is actuated, such that the fluid is discharged from the interior of the thermal management component 13; wherein the collection chamber 11b is also configured to collect emissions from the thermal management component 13.

Specifically, when the pressure relief mechanism 213 is actuated, the thermal management component 13 is damaged, and the fluid is discharged from the interior of the thermal management component 13. This can absorb heat from the battery cell 20 and lower the temperature of the emissions, thus reducing the risk resulting from the emissions. In this case, the fluid enters the collection chamber 11b together with the emissions cooled by the fluid. Due to the cooling by the fluid, the temperature of the emissions from the battery cell 20 can be quickly reduced, so the risk resulting from the emissions entering the collection chamber 11b is greatly reduced. The emissions do not have a great impact on other portions of the battery, such as other battery cells 20, so that the destructiveness caused by the abnormality of a single battery cell 20 can be suppressed as soon as possible, and the possibility of battery explosion can be reduced.

Optionally, in an embodiment of the present application, a portion of the thermal management component 13 around the weakened zone 135 can be damaged by the emissions from the battery cell 20 provided with the pressure relief mechanism 213, such that the fluid is discharged from the interior of the thermal management component 13.

Specifically, when the pressure relief mechanism 213 is actuated, the emissions from the battery cell 20 first damage (break through or melt) the weakened zone 135, and then pass through the weakened zone 135 and enter the collection chamber 11b. In addition, the emissions also damage portions around the weakened zone 135. For example, the hot emissions melt the surrounding thermal management component 13, so that the fluid is discharged from the interior of the thermal management component 13, thereby cooling the hot emissions. Since the temperature of the emissions is very high, no matter whether the fluid is used to heat or cool the battery cells 20, the temperature of the fluid is lower than the temperature of the emissions, so that the emissions can be cooled.

Optionally, in an embodiment of the present application, when the thermal management component 13 is provided with a recess 134, a side face of the recess 134 can be damaged by the emissions from the battery cell 20 provided with the pressure relief mechanism 213, such that the fluid is discharged from the interior of the thermal management component 13.

In the case of use of the recess 134, when the pressure relief mechanism 213 is actuated, the emissions from the battery cell 20 rush into the recess 134. Since the bottom wall of the recess 134 is relatively weak, the emissions will damage the bottom wall of the recess 134 and enter the collection chamber 11b. In addition, the emissions rushing into the recess 134 also melt the side face of the recess 134, so that the fluid is discharged from the interior of the thermal management component 13, thereby cooling the hot emissions.

Optionally, the radial dimension of the recess 134 gradually decreases in a direction away from the pressure relief mechanism 213. That is, the side face of the recess 134 is an inclined plane. This can increase the contact area with the emissions and facilitate the damage by the emissions. For example, an inclination angle of the side face of the recess 134 (an included angle between the side face and the plane where the bottom wall is located) may be in the range from 15° to 85°.

When actuated, the pressure relief mechanism 213 is deformed to communicate the inside and outside of the battery cell 20. For example, with respect to the pressure relief mechanism 213 using an indentation, when actuated, the pressure relief mechanism 213 is fractured at the indentation and opened toward two sides. Accordingly, the pressure relief mechanism 213 needs a certain deformation space. In an embodiment of the present application, the recess 134 is configured as an avoidance chamber for enabling the pressure relief mechanism 213 to be opened when the pressure relief mechanism 213 is actuated. The avoidance chamber provides a deformation space for the pressure relief mechanism 213, such that the pressure relief mechanism 213 is deformed toward the thermal management component 13 and fractured.

In the case of being used as an avoidance chamber, the recess 134 should be arranged such that it meets the condition that the pressure relief mechanism 213 can be opened when actuated. Specifically, the depth of the recess 134 is related to the size of the pressure relief mechanism 213. As an embodiment of the present application, the recess 134 has a depth greater than 1 mm. For example, the recess 134 may have a depth of 3 mm or more than 3 mm, so as to further facilitate the opening of the pressure relief mechanism 213. The area of the opening of the recess 134 is also related to the area of the pressure relief mechanism 213. In order that the pressure relief mechanism 213 can be opened, a ratio of the area of the opening of the recess 134 to the area of the pressure relief mechanism 213 needs to be greater than a certain value. In addition, in order to facilitate the damage to the side face of the recess 134 by the emissions, the ratio of the area of the opening of the recess 134 to the area of the pressure relief mechanism 213 also needs to be less than a certain value. For example, the ratio of the area of the opening of the recess 134 to the area of the pressure relief mechanism 213 may range from 0.5 to 2.

When the pressure relief mechanism 213 is provided at the first wall 21a of the battery cell 20, at least a portion of the pressure relief mechanism 213 may protrude outward from the first wall 21a. This can facilitate the installation of the pressure relief mechanism 213 and ensure the internal space of the battery cell 20. Optionally, as shown in FIG. 16, in an embodiment of the present application, in the case where at least a portion of the pressure relief mechanism 213 protrudes outward from the first wall 21a, the avoidance chamber may be configured to accommodate the at least portion of the pressure relief mechanism 213. In this way, the first wall 21a of the battery cell 20 can be closely attached to the surface of the thermal management component 13, which facilitates the fixation of the battery cell 20 and can also save space and improve the thermal management efficiency. Moreover, when the pressure relief mechanism 213 is actuated, the emissions from the battery cell 20 can be discharged toward the avoidance chamber and away from the battery cell 20, thereby reducing the risk resulting from the emissions, so that the safety of the battery can be enhanced.

Optionally, in an embodiment of the present application, a portion of the first wall 21a around the pressure relief mechanism 213 protrudes outward, and the avoidance chamber is configured to accommodate the outward protruding portion of the first wall 21a around the pressure relief mechanism 213. Similarly, in the case where the portion of the first wall 21a around the pressure relief mechanism 213 protrudes outward, the avoidance chamber can ensure that the first wall 21a of the battery cell 20 can be closely attached to the surface of the thermal management component 13, which facilitates the fixation of the battery cell 20 and can also save space and improve the thermal management efficiency.

In the foregoing embodiment, the weakened zone 135 is arranged such that when the pressure relief mechanism 213 is actuated, the emissions from the battery cell 20 pass through the weakened zone 135 and enter the collection chamber 11b. In addition to the weakened zone, it is also possible to make the emissions enter the collection chamber 11b by providing a through hole.

Optionally, as shown in FIG. 17, in an embodiment of the present application, the thermal management component 13 is provided with a second through hole 137. The second through hole 137 is configured such that the emissions from the battery cell 20 provided with the pressure relief mechanism 213 can enter the collection chamber 11b through the second through hole 137 when the pressure relief mechanism 213 is actuated.

Optionally, the second through hole 137 may be arranged opposite to the pressure relief mechanism 213. In this way, when the pressure relief mechanism 213 is actuated, the emissions can directly enter the collection chamber 11b through the second through hole 137.

Optionally, in an embodiment of the present application, in the case where the second through hole 137 is provided, a portion of the thermal management component 13 around the second through hole 137 can be damaged by the emissions from the battery cell 20 provided with the pressure relief mechanism 213, such that the fluid is discharged from the interior of the thermal management component 13.

Specifically, when the pressure relief mechanism 213 is actuated, the emissions from the battery cell 20 enter the collection chamber 11b through the second through hole 137. In addition, the emissions also damage portions around the second through hole 137. For example, the hot emissions melt the surrounding thermal management component 13, so that the fluid is discharged from the interior of the thermal management component 13, thereby cooling the hot emissions.

Optionally, in an embodiment of the present application, a hole wall of the second through hole 137 can be damaged by the emissions from the battery cell 20 provided with the pressure relief mechanism 213, such that the fluid is discharged from the interior of the thermal management component 13.

When the pressure relief mechanism 213 is actuated, the emissions from the battery cell 20 rush into the second through hole 137. Since the emissions have high pressure and high heat, the emissions further melt the hole wall of the second through hole 137 when passing through the second through hole 137, so that the fluid is discharged from the interior of the thermal management component 13, thereby cooling the emissions.

Optionally, the radial dimension of the second through hole 137 gradually decreases in the direction away from the pressure relief mechanism 213. That is, the hole wall of the second through hole 137 is an inclined plane. This can increase the contact area with the emissions and facilitate the damage by the emissions.

Optionally, similar to the foregoing recess 134, the second through hole 137 should also be arranged such that it meets the condition that the pressure relief mechanism 213 can be opened when actuated. As an embodiment of the present application, the area of an opening of the second through hole 137 is related to the area of the pressure relief mechanism 213. In order that the pressure relief mechanism 213 can be opened, a ratio of the area of the opening of the second through hole 137 to the area of the pressure relief mechanism 213 needs to be greater than a certain value. In addition, in order to facilitate the damage to the side wall of the second through hole 137 by the emissions, the ratio of the area of the opening of the second through hole 137 to the area of the pressure relief mechanism 213 also needs to be less than a certain value. For example, the ratio of the area of the opening of the second through hole 137 to the area of the pressure relief mechanism 213 ranges from 0.5 to 2.

Optionally, in an embodiment of the present application, the pressure relief mechanism 213 is provided at the first wall 21a of the battery cell 20, the first wall 21a is attached to the thermal management component 13, at least a portion of the pressure relief mechanism 213 protrudes outward from the first wall 21a, and the second through hole 137 is configured to accommodate the at least portion of the pressure relief mechanism 213. In this way, the first wall 21a of the battery cell 20 can be closely attached to the surface of the thermal management component 13, which facilitates the fixation of the battery cell 20 and can also save space and improve the thermal management efficiency. Moreover, when the pressure relief mechanism 213 is actuated, the emissions from the battery cell 20 can be discharged toward the second through hole 137 and away from the battery cell 20, thereby reducing the risk resulting from the emissions, so that the safety of the battery can be enhanced.

Optionally, in an embodiment of the present application, a portion of the first wall 21a around the pressure relief mechanism 213 protrudes outward, and the second through hole 137 is configured to accommodate the outward protruding portion of the first wall 21a around the pressure relief mechanism 213. In the case where the portion of the first wall 21a around the pressure relief mechanism 213 protrudes outward, the second through hole 137 can ensure that the first wall 21a of the battery cell 20 can be closely attached to the surface of the thermal management component 13, which facilitates the fixation of the battery cell 20 and can also save space.

It should be understood that, in addition to providing the thermal management component 13 with a structure such that the thermal management component 13 can be damaged when the pressure relief mechanism 213 is actuated, the pressure relief mechanism 213 may be also provided with a structure that enables the thermal management component 13 to be damaged when the pressure relief mechanism 213 is actuated.

Optionally, in an embodiment of the present application, the pressure relief mechanism 213 is provided with a breaking device. The breaking device is configured to damage the thermal management component 13 when the pressure relief mechanism 213 is actuated, such that the fluid is discharged from the interior of the thermal management component 13. For example, the breaking device may be a spike, but this is not limited by the embodiment of the present application.

FIG. 18 is a schematic diagram of a battery 10 according to an embodiment of the present application. The battery 10 may include a case 11, a plurality of battery cells 20, and a bus component 12.

At least one battery cell 20 of the plurality of battery cells 20 includes a pressure relief mechanism 213. The pressure relief mechanism 213 is configured, when an internal pressure or temperature of the battery cell 20 provided with the pressure relief mechanism 213 reaches a threshold, to be actuated to release the internal pressure or temperature.

The bus component 12 is configured to electrically connect the plurality of battery cells 20.

The case 11 is a case 11 described in the foregoing embodiments, and the electrical chamber 11a of the case 11 is configured to accommodate the plurality of battery cells 20 and the bus component 12, wherein the collection chamber 11b of the case 11 collects, when the pressure relief mechanism 213 is actuated, emissions from the battery cell 20 provided with the pressure relief mechanism 213.

Figure 19:
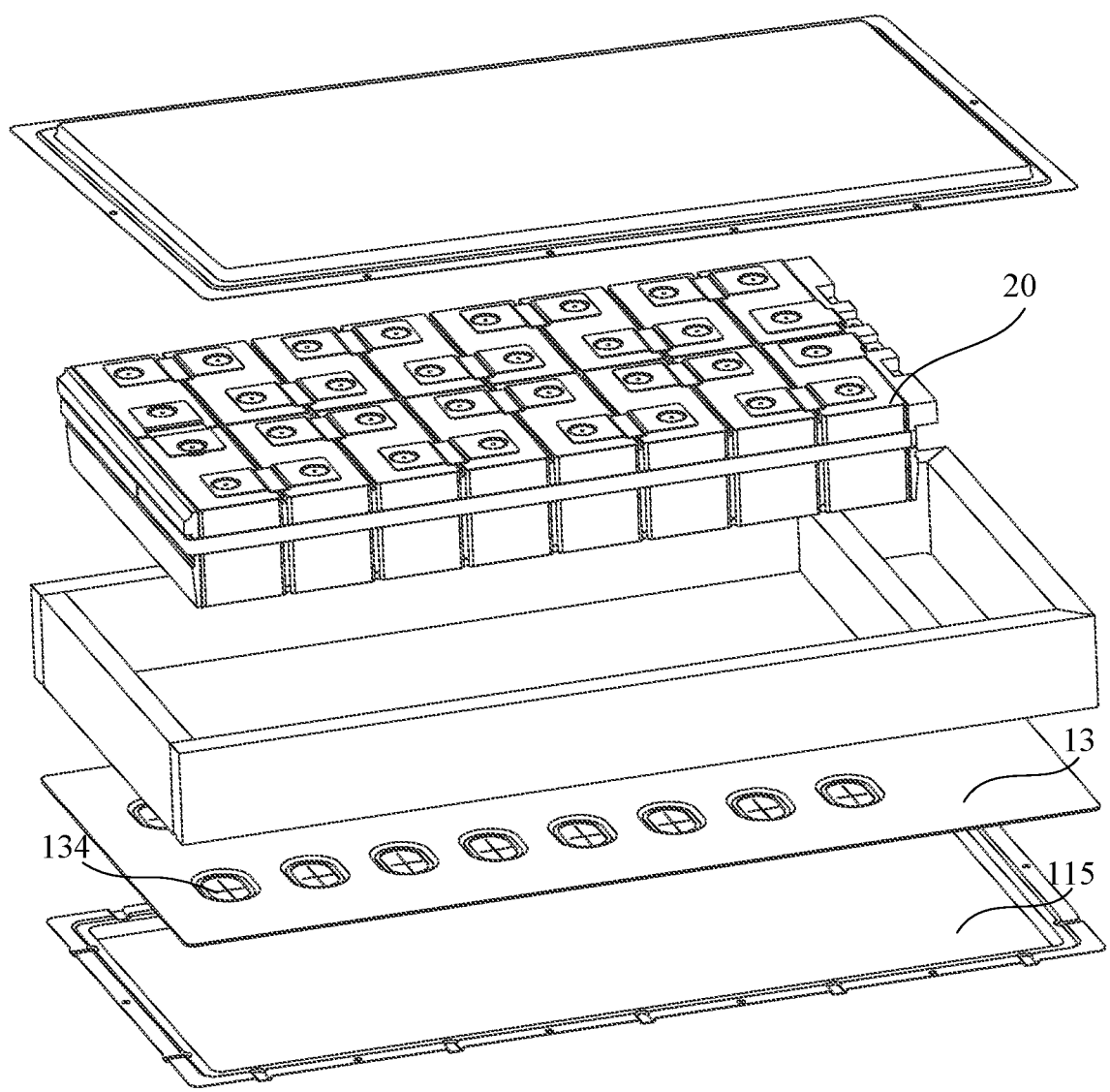
FIG. 19 is an exploded view of a battery according to an embodiment of the present application.

FIG. 19 is an exploded view of a battery 10 according to an embodiment of the present application. In the embodiment shown in FIG. 19, the thermal management component 13 is provided with a recess 134, and forms a collection chamber together with a protective member 115.

For the description of each component in the battery 10, reference can be made to the foregoing embodiments, which will not be repeated here for brevity.

An embodiment of the present application further provides a power consumption device, which may include the battery 10 in each of the foregoing embodiments. Optionally, the power consumption device may be a vehicle 1, a ship or a spacecraft.

The case of a battery, the battery and the power consumption device according to the embodiments of the present application are described above, and a method and device for preparing a battery according to the embodiments of the present application will be described below. For the parts not described in detail, reference can be made to the foregoing embodiments.

Figure 20:
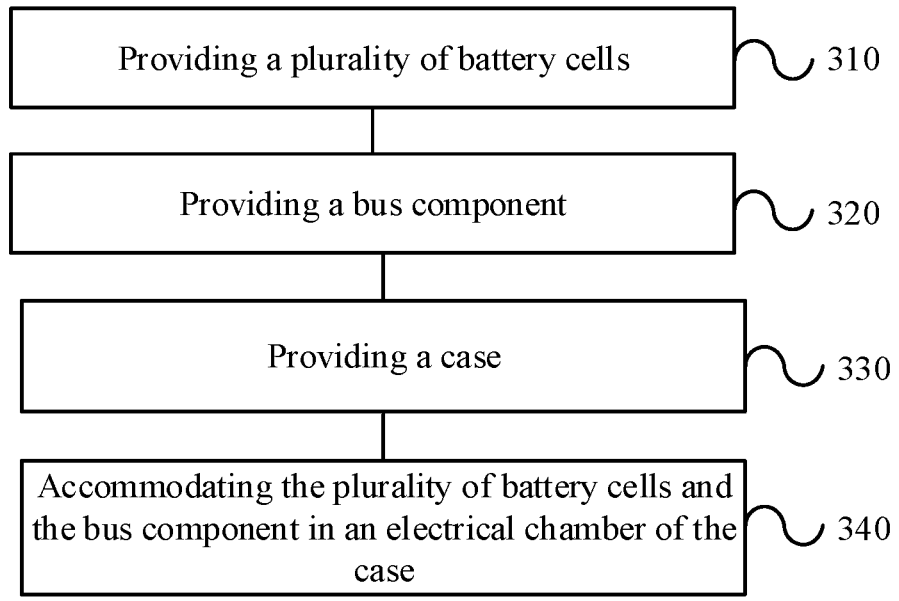
FIG. 20 is a schematic flowchart of a method for preparing a battery according to an embodiment of the present application.

FIG. 20 shows a schematic flowchart of a method 300 for preparing a battery according to an embodiment of the present application. As shown in FIG. 20, the method 300 may include:

step 310: providing a plurality of battery cells 20, at least one battery cell 20 of the plurality of battery cells 20 including a pressure relief mechanism 213, and the pressure relief mechanism 213 being configured, when an internal pressure or temperature of the battery cell 20 provided with the pressure relief mechanism 213 reaches a threshold, to be actuated to release the internal pressure or temperature;

step 320: providing a bus component 12, the bus component 12 being configured to electrically connect the plurality of battery cells 20;

step 330: providing a case 11, the case 11 including: an electrical chamber 11a; a thermal management component 13 configured to accommodate a fluid; and a collection chamber 11b, wherein the thermal management component 13 isolates the electrical chamber 11a from the collection chamber 11b; and step 340: accommodating the plurality of battery cells 20 and the bus component 12 in the electrical chamber 11a, wherein the collection chamber 11b collects, when the pressure relief mechanism 213 is actuated, emissions from the battery cell 20 provided with the pressure relief mechanism 213.

Figure 21:
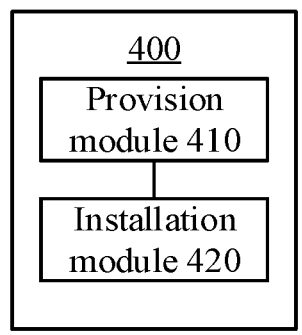
FIG. 21 is a schematic block diagram of a device for preparing a battery according to an embodiment of the present application.

FIG. 21 shows a schematic block diagram of a device 400 for preparing a battery according to an embodiment of the present application. As shown in FIG. 21, the device 400 for preparing a battery may include: a provision module 410 and an installation module 420.

The provision module 410 is configured to: provide a plurality of battery cells 20, at least one battery cell 20 of the plurality of battery cells 20 including a pressure relief mechanism 213, and the pressure relief mechanism 213 being configured, when an internal pressure or temperature of the battery cell 20 provided with the pressure relief mechanism 213 reaches a threshold, to be actuated to release the internal pressure or temperature; provide a bus component 12, the bus component 12 being configured to electrically connect the plurality of battery cells 20; and provide a case 11, the case 11 including: an electrical chamber 11a; a thermal management component 13 configured to accommodate a fluid; and a collection chamber 11b, wherein the thermal management component 13 isolates the electrical chamber 11a from the collection chamber 11b.

The installation module 420 is configured to accommodate the plurality of battery cells 20 and the bus component 12 in the electrical chamber 11a, wherein the collection chamber 11b collects, when the pressure relief mechanism 213 is actuated, emissions from the battery cell 20 provided with the pressure relief mechanism 213.

It should be finally noted that, the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A case of a battery, comprising:
an electrical chamber configured to accommodate a plurality of battery cells and a bus component, the bus component being configured to electrically connect the plurality of battery cells, wherein at least one battery cell of the plurality of battery cells comprises a pressure relief mechanism, and the pressure relief mechanism is configured, when an internal pressure or temperature of the battery cell provided with the pressure relief mechanism reaches a threshold, to be actuated to release the internal pressure;
a thermal management component configured to accommodate a fluid to adjust temperatures of the plurality of battery cells; and
a collection chamber configured to collect emissions from the battery cell provided with the pressure relief mechanism when the pressure relief mechanism is actuated;
wherein the thermal management component is configured to isolate the electrical chamber from the collection chamber.

2. The case according to claim 1, wherein the thermal management component is configured to be capable of being damaged when the pressure relief mechanism is actuated, such that the fluid is discharged from interior of the thermal management component, wherein the collection chamber is further configured to collect emissions from the thermal management component.

3. The case according to claim 1, wherein the thermal management component has a wall shared by the electrical chamber and the collection chamber.

4. The case according to claim 1, wherein the case further comprises:
a protective member, the protective member being configured to protect the thermal management component, and the protective member and the thermal management component forming the collection chamber.

5. The case according to claim 1, wherein the electrical chamber is isolated from the collection chamber by the thermal management component.

6. The case according to claim 1, wherein the thermal management component is provided with a weakened zone, and the weakened zone is configured to be capable of being damaged when the pressure relief mechanism is actuated, such that the emissions from the battery cell provided with the pressure relief mechanism pass through the weakened zone and enter the collection chamber.

7. The case according to claim 6, wherein the thermal management component is provided with a recess arranged opposite to the pressure relief mechanism, and a bottom wall of the recess forms the weakened zone.

8. The case according to claim 7, wherein the pressure relief mechanism is disposed at a first wall of the battery cell provided with the pressure relief mechanism, the first wall is attached to the thermal management component, and the recess is disposed on a surface of the thermal management component facing the first wall.

9. The case according to claim 8, wherein the thermal management component comprises a first thermally conductive plate and a second thermally conductive plate, the first thermally conductive plate is located between the first wall and the second thermally conductive plate and attached to the first wall, a first region of the first thermally conductive plate is recessed toward the second thermally conductive plate to form the recess, and the first region is connected to the second thermally conductive plate.

10. The case according to claim 9, wherein the first region is provided with a first through hole, and a radial dimension of the first through hole is less than that of the recess.

11. The case according to claim 7, wherein a side face of the recess is capable of being damaged by the emissions from the battery cell provided with the pressure relief mechanism, such that the fluid is discharged from interior of the thermal management component.

12. The case according to claim 8, wherein the recess is configured as an avoidance chamber for enabling the pressure relief mechanism to be opened when the pressure relief mechanism is actuated.

13. The case according to claim 7, wherein the recess has a depth greater than 1 mm.

14. The case according to claim 12, wherein at least a portion of the pressure relief mechanism protrudes outward from the first wall, and the avoidance chamber is configured to accommodate the at least portion of the pressure relief mechanism.

15. The case according to claim 1, wherein the thermal management component is provided with a second through hole, and the second through hole is configured such that the emissions from the battery cell provided with the pressure relief mechanism are capable of entering the collection chamber through the second through hole when the pressure relief mechanism is actuated.

16. The case according to claim 15, wherein a hole wall of the second through hole is capable of being damaged by the emissions from the battery cell provided with the pressure relief mechanism, such that the fluid is discharged from interior of the thermal management component.

17. The case according to claim 1, wherein the pressure relief mechanism is disposed at the first wall of the battery cell provided with the pressure relief mechanism, and a second wall of the battery cell provided with the pressure relief mechanism is provided with electrode terminals and is different from the first wall.

18. The case according to claim 17, wherein the second wall is arranged opposite to the first wall.

19. A battery, comprising:
a plurality of battery cells, at least one battery cell of the plurality of battery cells comprising a pressure relief mechanism, and the pressure relief mechanism being configured, when an internal pressure or temperature of the battery cell provided with the pressure relief mechanism reaches a threshold, to be actuated to release the internal pressure;
a bus component configured to electrically connect the plurality of battery cells; and
a case comprising:
an electrical chamber configured to accommodate the plurality of battery cells and the bus component;
a thermal management component configured to accommodate a fluid to adjust temperatures of the plurality of battery cells; and
a collection chamber configured to collect emissions from the battery cell provided with the pressure relief mechanism when the pressure relief mechanism is actuated;
wherein the thermal management component is configured to isolate the electrical chamber from the collection chamber.

20. A power consumption device, comprising: a battery comprising:
a plurality of battery cells, at least one battery cell of the plurality of battery cells comprising a pressure relief mechanism, and the pressure relief mechanism being configured, when an internal pressure or temperature of the battery cell provided with the pressure relief mechanism reaches a threshold, to be actuated to release the internal pressure;
a bus component configured to electrically connect the plurality of battery cells; and
a case comprising:
an electrical chamber configured to accommodate the plurality of battery cells and the bus component;
a thermal management component configured to accommodate a fluid to adjust temperatures of the plurality of battery cells; and
a collection chamber configured to collect emissions from the battery cell provided with the pressure relief mechanism when the pressure relief mechanism is actuated;
wherein the thermal management component is configured to isolate the electrical chamber from the collection chamber.

* * * * *